(12) United States Patent
Adhikari et al.

(10) Patent No.: US 7,583,667 B2
(45) Date of Patent: Sep. 1, 2009

(54) AUTOMATIC DETERMINATION OF CONNECTIVITY PROBLEM LOCATIONS OR OTHER NETWORK-CHARACTERIZING INFORMATION IN A NETWORK UTILIZING AN ENCAPSULATION PROTOCOL

(75) Inventors: Akshay Adhikari, Basking Ridge, NJ (US); Amit Agarwal, Milpitas, CA (US); Lorraine Denby, Berkeley Heights, NJ (US); Russell C. Jones, San Jose, CA (US); Rod D. Livingood, Cupertino, CA (US); Jean Meloche, Madison, NJ (US); Anupam Rai, San Jose, CA (US); Wayne Sam, Verona, NJ (US); John R. Tuck, Jr., Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 967 days.

(21) Appl. No.: 11/014,546

(22) Filed: Dec. 16, 2004

(65) Prior Publication Data

US 2005/0207410 A1 Sep. 22, 2005

Related U.S. Application Data

(60) Provisional application No. 60/554,635, filed on Mar. 19, 2004.

(51) Int. Cl.
*H04L 12/28* (2006.01)
*H04L 12/56* (2006.01)
(52) U.S. Cl. .................................................. 370/389

(58) Field of Classification Search .................. 370/389, 370/390, 328, 348, 252, 250, 466, 236, 270, 370/486, 432, 401, 392, 230, 216, 537, 395, 370/244, 393, 338; 379/88.27; 725/36, 61, 725/91, 144, 240.26; 714/25; 709/224, 227, 709/229, 206, 228

See application file for complete search history.

(56) References Cited

U.S. PATENT DOCUMENTS 6,778,502 B2 * 8/2004 Ricciulli ..................... 370/238

(Continued)

*Primary Examiner*—Wing F Chan
*Assistant Examiner*—Prenell P Jones
(74) *Attorney, Agent, or Firm*—Ryan, Mason & Lewis, LLP

(57) ABSTRACT

Techniques for determining a problem location or otherwise characterizing a network comprising a plurality of processing elements, including at least one processing element associated with performance of a packet encapsulation operation of an encapsulation protocol. The packet encapsulation operation is performed on a test packet to generate an encapsulated packet, the test packet having a time to live (TTL) value and an identifier. In conjunction with performance of the packet encapsulation operation, the TTL value and the identifier of the test packet are copied to a header of the encapsulated packet. The encapsulated packet is transmitted, and a determination is made as to whether a reply packet has been received responsive to transmission of the encapsulated packet. The reply packet, if any, is processed to obtain information utilizable in determining the problem location or otherwise characterizing the network. By way of example, these operations may be repeated, for subsequent test packets with increasing TTL values, until an amount of router hop information sufficient to determine the problem location is obtained.

26 Claims, 4 Drawing Sheets

U.S. PATENT DOCUMENTS

| | | | |
|---|---|---|---|
| 6,940,821 B1* | 9/2005 | Wei et al. | 370/244 |
| 6,965,593 B2* | 11/2005 | Donahue et al. | 370/352 |
| 7,061,942 B2* | 6/2006 | Noronha et al. | 370/537 |
| 7,286,652 B1* | 10/2007 | Azriel et al. | 379/88.22 |
| 7,376,731 B2* | 5/2008 | Khan et al. | 709/224 |
| 2002/0018443 A1* | 2/2002 | Vleesschauwer et al. | 370/229 |
| 2003/0086425 A1 | 5/2003 | Bearden et al. | |
| 2003/0091165 A1 | 5/2003 | Bearden et al. | |
| 2003/0097438 A1 | 5/2003 | Bearden et al. | |
| 2003/0145077 A1* | 7/2003 | Khan et al. | 709/224 |
| 2003/0223466 A1* | 12/2003 | Noronha et al. | 370/537 |
| 2004/0052257 A1* | 3/2004 | Abdo et al. | 370/392 |
| 2004/0062204 A1 | 4/2004 | Bearden et al. | |
| 2004/0100949 A1* | 5/2004 | Bennett | 370/384 |
| 2004/0252694 A1* | 12/2004 | Adhikari et al. | 370/395.2 |
| 2007/0110053 A1* | 5/2007 | Soni et al. | 370/389 |

* cited by examiner

AUTOMATIC DETERMINATION OF CONNECTIVITY PROBLEM LOCATIONS OR OTHER NETWORK-CHARACTERIZING INFORMATION IN A NETWORK UTILIZING AN ENCAPSULATION PROTOCOL

RELATED APPLICATION(S)

The present application claims the priority of U.S. Provisional Patent Application Ser. No. 60/554,635, filed Mar. 19, 2004 and entitled "Method and Apparatus for Automatic Determination of Connectivity Problem Locations in an Encapsulated Protocol Network," the disclosure of which is incorporated by reference herein.

FIELD OF THE INVENTION

The invention relates generally to techniques for determining connectivity problem locations or other information characterizing a network, and more particularly to techniques for determining such information in a network which utilizes at least one encapsulation protocol.

BACKGROUND OF THE INVENTION

A number of techniques are known in the art for identifying the location of connectivity problems in a network. For example, the well-known "traceroute" utility allows a network administrator to determine an exact point of failure in a situation in which network connectivity is broken. However, a serious problem with conventional traceroute applications is that they do not provide complete router hop information in a given network path when run in a Virtual Private Network (VPN).

Consider an arrangement in which a VPN operating in tunnel mode is configured between security gateways each associated with a corresponding private network. An Internet Protocol (IP) packet sourced from one of the private networks and destined to the other will typically be encapsulated using IP Encapsulating Security Payload (ESP). IP, ESP and the related IP Authentication Header (AH) are described in RFC 791, RFC 2406 and RFC 2402, respectively, of the Internet Engineering Task Force (IETF), said RFCs being incorporated by reference herein. If the source security gateway detects a break in network connectivity, it can automatically initiate transmission of a traceroute packet for a previously known IP address in its associated private network. However, after the encapsulation, the new IP header will not reflect the time to live (TTL) value of the original traceroute packet. Typically, the TTL of the encapsulating IP header is set to some default high number, such as 64 or 128. Reply packets from the other security gateway are encapsulated in a similar manner. Encapsulation in this situation thus introduces a discontinuity in TTL values which prevents the traceroute application from determining router hop information for any network routers between the security gateways. As a result, the traceroute application may be unable to determine the location of the connectivity problem in these and other encapsulated protocol situations.

Accordingly, what is needed is an improved approach to determination of connectivity problem locations, or other types of network-characterizing information, in networks which utilize encapsulation protocols.

SUMMARY OF THE INVENTION

The invention addresses the above-noted need by providing, in an illustrative embodiment, an improved traceroute application which overcomes one or more of the problems associated with use of the conventional traceroute application in a VPN or other network utilizing an encapsulation protocol.

In one aspect of the invention, techniques are provided for determining a problem location or other information characterizing a network comprising a plurality of processing elements including at least one processing element associated with performance of a packet encapsulation operation of an ESP protocol or other encapsulation protocol.

The packet encapsulation operation is performed on a traceroute packet or other type of test packet to generate an encapsulated packet. The test packet has a TTL value and an identifier, and in conjunction with performance of the packet encapsulation operation, the TTL value and the identifier of the test packet are copied to a header of the encapsulated packet. For example, the TTL value and the identifier may be copied from an IP header of a traceroute packet to an IP header of an ESP packet in conjunction with performance of the encapsulation process.

The encapsulated packet is transmitted, and a determination is made as to whether a reply packet has been received responsive to transmission of the encapsulated packet. The reply packet, if any, is processed to obtain information utilizable in determining the problem location in the network. By way of example, these operations may be repeated, for subsequent test packets with increasing TTL values, until an amount of router hop information sufficient to determine the problem location is obtained.

In the illustrative embodiment, the network comprises a VPN having first and second security gateways coupled together via the Internet, and one of the first and second security gateways comprises the processing element associated with performance of the packet encapsulation operation of the encapsulation protocol.

The copying of the TTL value and the identifier may be facilitated by setting corresponding socket options on a socket used to send a traceroute packet comprising the test packet.

The reply packet may be validated, for example, by determining if the identifier or other information associated with the test packet is present in a data portion of the reply packet.

If the reply packet is determined to contain in a data portion thereof information identifying a destination port of the test packet, or a maximum TTL value has been reached without receipt of a reply packet containing in a data portion thereof information identifying a destination port of the test packet, a conventional traceroute application that does not involve copying of the TTL value and the identifier may be initiated to obtain remaining router hop information. This conventional traceroute application is preferably initiated using a different socket than that used for previous test packets, and a TTL value of one.

Advantageously, the present invention in the illustrative embodiment provides a particularly efficient and accurate mechanism for determining router hop information for network routers between security gateways of a VPN, thereby facilitating the determination of connectivity problem locations in such networks. The invention can also or alternatively be used to determine network performance information such as performance degradation problem locations or end-to-end performance degradation due to rerouting, and a wide variety of other types of network-characterizing information.

DETAILED DESCRIPTION OF THE INVENTION

The invention will be illustrated below in conjunction with exemplary configurations of networks, systems and devices. It should be understood, however, that the invention is not limited to use with any particular type of network, system or device configuration. Those skilled in the art will recognize that the disclosed techniques may be used in any network application in which it is desirable to provide improved determination of connectivity problem locations, network performance, or other network-characterizing information.

Figure 1:
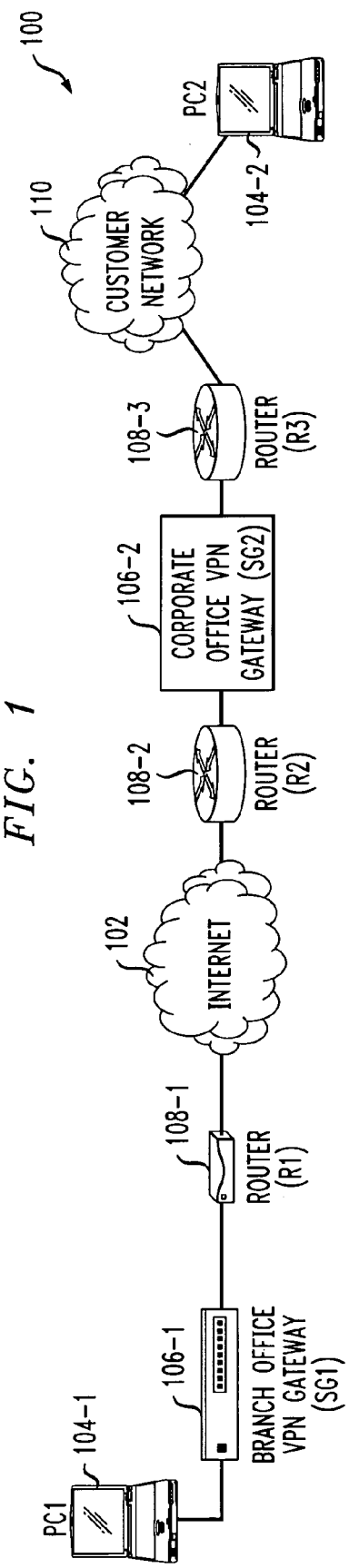
FIG. 1 shows an example network topology of a VPN in which the present invention is implemented.

Referring initially to FIG. 1, a network 100 comprises a number of endpoint devices which communicate via a VPN established over the public Internet 102. More specifically, a first endpoint device 104-1, illustrative shown as personal computer PC 1 associated with a private network of a branch office, communicates with a second endpoint device 104-2, illustratively shown as personal computer PC2 associated with a private network of a corporate office. Such endpoint devices may also be referred to as "hosts" herein. The branch office and corporate office networks have associated security gateways 106-1 and 106-2, illustratively shown as branch office VPN gateway SG1 and corporate office VPN gateway SG2, respectively. The VPN comprises routers 108-1 and 108-2, also denoted R1 and R2 herein, which couple the respective VPN gateways SG1 and SG2 to the Internet 102. PC1 is directly coupled to the branch office VPN gateway SG1, while PC2 is coupled to the corporate office VPN gateway SG2 via router 108-3 and customer network 110. PC1 and PC2, although illustratively shown as laptop computers, may alternatively comprise other types of computers, or more generally any type of processor-based endpoint device.

The VPN in this embodiment establishes secure logical network connections across an unsecured network. More specifically, a VPN operating in tunnel mode is configured between SG1 and SG2. The security gateways SG1 and SG2 comprise VPN security gateways, and are also assumed to incorporate firewall functionality. Such firewalls will allow only VPN traffic to be passed from SG1 and SG2 to Internet 102. All non-VPN traffic is dropped by the SG1 and SG2 firewalls.

Again, it is to be appreciated that this particular network topology is presented by way of illustrative example only. The invention is not restricted to use with this or any other particular network topology.

The present invention in accordance with one aspect thereof provides an improved traceroute technique that can be used to provide complete and accurate router hop information, as well as associated network performance information, in a VPN network topology such as that shown in FIG. 1. For example, as will be described, the traceroute technique can be utilized to identify a path of a VPN operating in tunnel mode between security gateways of a network, and to determine network performance information associated with that path. Such network performance information may include, without limitation, performance degradation problem locations, and end-to-end degradation due to rerouting. It is also possible to determine routing changes associated with a path of a VPN operating in tunnel mode between security gateways of the network, for example, by comparing the path at time A to the path at time B, or before and after a given degradation of end-to-end performance. Numerous other types of network-characterizing information may be determined using the traceroute technique, as will be readily apparent to those skilled in the art, and the invention is not limited in this regard.

The traceroute technique in the illustrative embodiment is referred to as a "traceroute application," where such an application is intended to be construed generally so as to encompass any software program or portion thereof which utilizes a traceroute utility as described herein.

Figure 2:
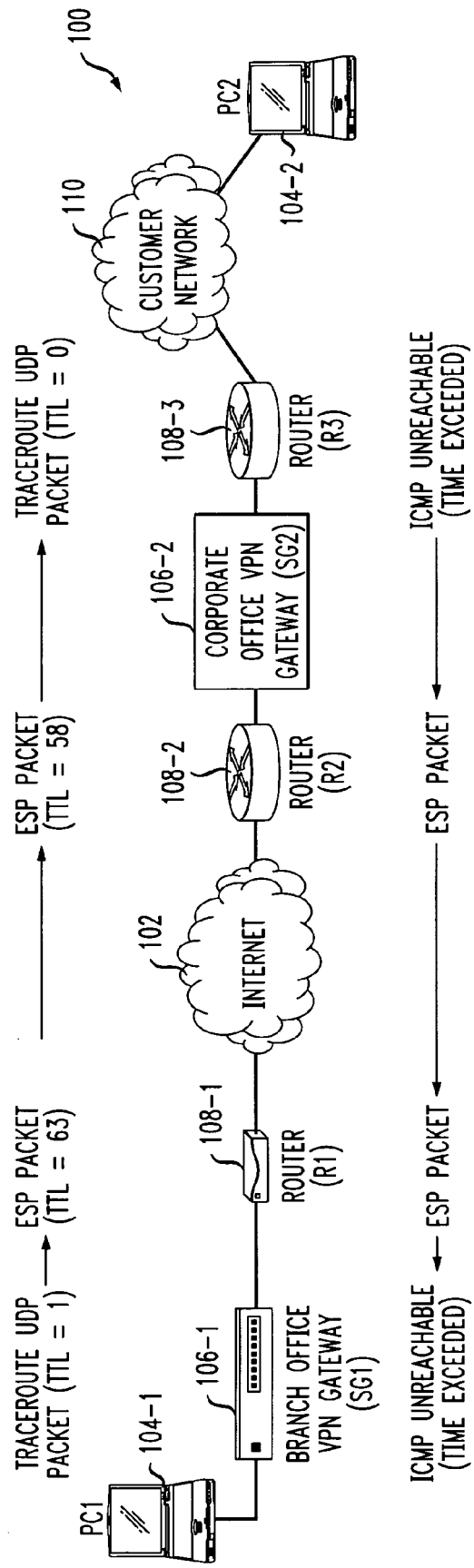
FIG. 2 illustrates the operation of a conventional traceroute application in the FIG. 1 VPN.

FIG. 2 shows the manner in which a conventional traceroute application fails to provide complete router hop information in the network 100 of FIG. 1. A traceroute packet sourced from SG1 and destined for SG2 will typically be encapsulated using ESP, with or without AH, leading to discontinuity in the TTL values of a given traceroute packet as previously described herein. This situation is illustrated for the network 100 in FIG. 2.

In this topology, a capability is needed to detect the exact problem location when network connectivity is broken between the branch network and corporate network security gateways SG1 and SG2. The network connectivity may be broken, for example, at any of the routers R1, R2, or R3, or anywhere in the network path through public Internet 102. If SG1 detects that the network connectivity is broken, it can automatically initiate a traceroute application for a previously known IP address in the corporate network (e.g., PC2).

Assume a traceroute packet is sourced from SG1 responsive to detection of a connectivity problem in the network 100. The traceroute packet is configured as a User Datagram Protocol (UDP) packet, and initially has a TTL value of one. UDP is described in IETF RFC 768, also incorporated by reference herein. The ESP encapsulation results in an ESP packet for which the TTL value is set to a default high number, in this case 64. In conjunction with the routing of the ESP packet from SG1 to router R1, its TTL value is decremented by one to 63. The ESP packet then passes over Internet 102 to router R2. The example assumes that the TTL value has been decremented multiple additional times, i.e., a total of five additional times, for multiple router hops incurred between router R1 and router R2, resulting in a TTL value of 58 at router R2. SG2 decapsulates the ESP packet received from router R2 to obtain the original traceroute UDP packet, for which the original TTL value of one is decremented to a value of zero in conjunction with routing of the packet to router R3.

At this point, R3 will reply with an Internet Control Message Protocol (ICMP) Time Exceeded reply packet. This reply packet will again be encapsulated in an ESP packet and will be sent back to SG1. SG1 will then decapsulate the ESP packet and the traceroute application will indicate the first router hop as corresponding to router R3. However, it is readily apparent that this traceroute result does not provide any useful information if network connectivity is broken between SG1 and SG2, for example, due to network connectivity issues involving R1, R2 or public Internet 102. Thus, as indicated previously herein, the discontinuity in TTL value introduced by the ESP encapsulation process prevents the conventional traceroute application from determining the exact location of a connectivity problem in network 102.

It should also be noted that, in the FIG. 2 scenario above, the branch office security gateway SG1 may not be able to run the traceroute application outside of the VPN if firewall policies do not allow any non-VPN traffic to pass from SG1 to public Internet 102. The problem illustrated in FIG. 2 therefore typically cannot be overcome by attempting to run the traceroute application outside of the VPN.

Additional details regarding the operation of the conventional traceroute application can be found in the above-cited RFCs, and in, e.g., TCP/IP Illustrated Volume 1, W. Richard Stevens, which is also incorporated by reference herein.

An improved traceroute application implemented in network 100 in accordance with the invention will now be described with reference to FIGS. 3 and 4. Except for the modifications described herein, the improved traceroute application of the illustrative embodiment is assumed to preserve the functionality commonly associated with a conventional traceroute application. For example, a conventional traceroute application typically sends multiple probes to a single host with different destination UDP ports, and the modified traceroute application of the illustrative embodiment is assumed to also have this capability.

Generally, the improved traceroute application of the illustrative embodiment modifies the encapsulation process for a given outgoing traceroute packet so as to support the copying of a TTL value and an identification field from the original traceroute packet IP header to the ESP packet IP header during the encapsulation process. The identification field uniquely identifies each traceroute UDP packet sent by a host.

For example, the traceroute application can utilize two new socket options, set on the UDP socket it is using to send traceroute packets, to copy the respective TTL value and identification field of the original traceroute packet to the ESP packet IP header during the encapsulation process.

Although illustrated in the context of traceroute packets, the present invention can be implemented using other types of test packets. Also, other types of identifiers may be used in place of the identification field. Such identifiers may comprise, for example, a portion of an identification field.

Figure 3:
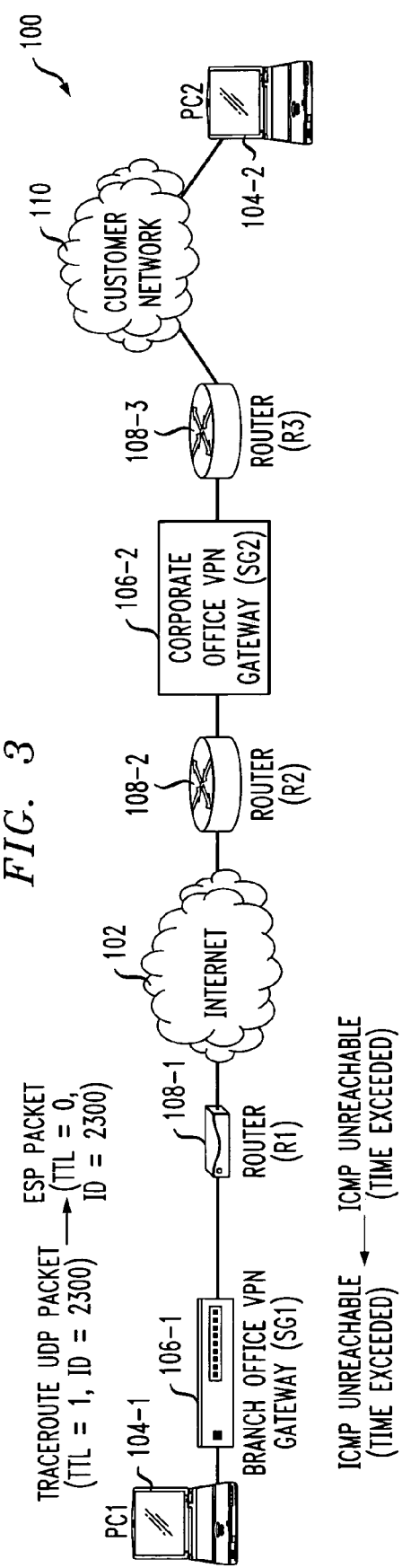
FIG. 3 shows the manner in which an improved traceroute application is implemented in the FIG. 1 VPN for a reply received from a router coupled to the Internet.

FIG. 3 illustrates the operation of the improved traceroute application in the network 100 for the case of an ICMP Time Exceeded reply packet received from router R1 coupled to Internet 102. The original traceroute UDP packet has a TTL value of one, and an identification field of 2300. SG1 encapsulates the traceroute UDP packet such that the original TTL value and the identification field are copied to the ESP packet IP header during the encapsulation process. In conjunction with routing of the ESP packet from SG1 to router R1, the TTL value is decremented to zero, and R1 sends an ICMP Time Exceeded reply packet back to SG1. The TTL value correctly indicates the number of router hops in this example, namely, a single router hop from SG1 to router R1.

Additional traceroute packets associated with this traceroute application are then transmitted by SG1 with increasing initial TTL values, and will result in SG1 receiving ICMP Time Exceeded reply packets from other routers in the network path between security gateways SG1 and SG2. This allows the network path between SG1 and SG2, including the portion within the public Internet 102, to be fully characterized.

It should be noted that the ICMP reply packets returned to SG1 will also contain the original IP header of the ESP packet and eight bytes of IP data.

A conventional traceroute application typically listens for any ICMP reply packet, and this functionality is not modified in the illustrative embodiment. The conventional traceroute application expects the ICMP reply packet to contain the original IP header and eight bytes of IP data. The eight byte data portion in the conventional traceroute application will contain the UDP header of the original traceroute packet. The conventional traceroute application uses this UDP header for identifying the reply by validating the source and destination UDP port.

In the VPN topology of the illustrative embodiment, the ICMP reply packet will not contain the IP header and UDP header of the original traceroute packet. Instead it will contain the ESP IP header and eight bytes of ESP data. As indicated above, the improved traceroute application of the illustrative embodiment copies the identification field of the original traceroute packet to the ESP IP header and this ESP IP header will be present in the data portion of the ICMP reply packet. Thus, the ICMP reply packet for a given traceroute packet can be identified by validating the identification field in the ESP IP header in the data portion of the ICMP reply packet. Validation of SPI may be done as an additional check if UDP encapsulation is not being used. SG1 will perform UDP encapsulation of ESP packets when a Network Address Translation (NAT) device is present in the network path between SG1 and SG2.

Once all of the router hops between SG1 and SG2 have been discovered in the manner described above, the next traceroute packet, with an increased TTL, will reach SG2. The packet may reach the destination host, PC2 in this example, prior to expiration of the TTL. Such a case is highly probable, as the TTL value in the traceroute packet decapsulated by SG2 will be set to a relatively high value, equal to the number of router hops traveled between SG1 and SG2 including SG2 but excluding SG1.

Figure 4:
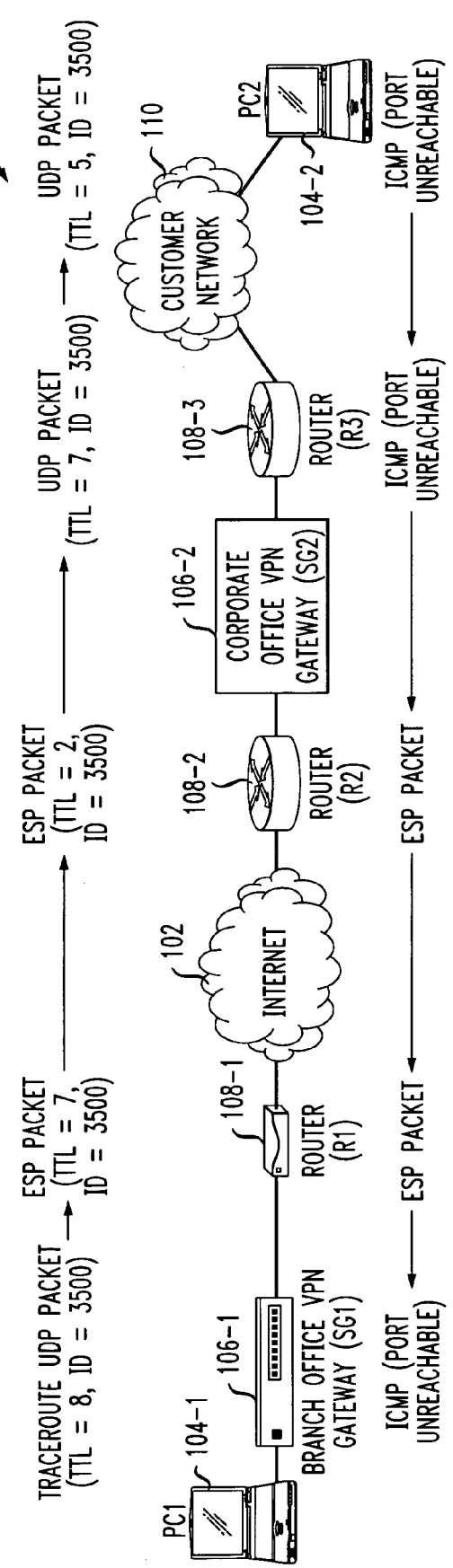
FIG. 4 shows the manner in which an improved traceroute application is implemented in the FIG. 1 VPN for a reply received from an endpoint of the VPN.

FIG. 4 shows an example of this situation in which the traceroute packet reaches the destination host PC2 without expiration of the TTL. The original traceroute UDP packet has a TTL value of eight, and an identification field of 3500. Again, SG1 encapsulates the traceroute UDP packet such that the original TTL value and the identification field are copied to the ESP packet IP header during the encapsulation process. The router hop associated with routing from SG1 to router R1 results in the TTL value being decremented to seven. Assuming again five additional router hops incurred in traversing Internet 102 from router R1 to router R2, the TTL value of the ESP packet at router R2 is two. SG2 decapsulates the ESP packet to obtain the original traceroute UDP packet which has a TTL value of eight. This value is decremented to seven as the UDP packet is routed from SG1 to router R3. Subsequent routing from R3 to PC2 via customer network 110 results in two additional decrements of the TTL value, to a final value of five, as indicated in the figure. PC2 upon receipt of the UDP packet with unexpired TTL sends an ICMP Port Unreachable reply packet back via network 110 and router R3 to SG2.

It is also possible that the TTL may expire before reaching the destination host PC2. This will occur, for example, if the number of router hops in the private network of SG2 is higher than the number of router hops between SG1 and SG2. Such a situation is unlikely but may occur, leading to the generation of an ICMP Time Exceeded reply packet.

A final possibility is that the traceroute packet may be dropped due to network connectivity issues, in which case there is no reply generated.

In the first two cases, where the traceroute packet either reaches the destination host or TTL expires before the host is reached, the ICMP reply packet will contain the IP header and eight bytes of IP data of the original traceroute packet. The eight bytes of IP data will be the UDP header of the original traceroute packet. The reply can be validated using the same validation approach used by the conventional traceroute application. More specifically, this approach involves determining whether the eight bytes of IP data correspond to the UDP header of the original traceroute packet by validating the protocol type in the IP header, and if this is true, validating whether the UDP header destination port is same as that of the original traceroute UDP packet. If the result of the determination is affirmative, then the reply may be discarded and thus will not be included in the final traceroute results.

In a situation in which no reply is received, the traceroute application will continue to send UDP packets with incremented TTL until a specified maximum hop count is reached.

It should be noted that in the FIG. 4 example, the improved traceroute application as described thus far will not be able to display information related to router R3 or any router hops in the customer network 110. Therefore, in order to provide a complete set of traceroute results, the conventional traceroute application may be applied to provide the missing information relating to R3 and network 110.

The traceroute application described above may end due to receipt of a reply with the original UDP destination port in the IP data in the ICMP reply packet data portion, or by reaching the maximum hop count without receiving any reply with the original UDP destination port in the IP data in the ICMP reply packet data portion. The latter may occur, for example, in the event of a network connectivity failure within public Internet 102 or the private network of SG2.

When the traceroute application of the illustrative embodiment ends because of any of the above conditions, a conventional traceroute application should be started over a different socket with a TTL value of 1. This allows all of the router hops in the private network of SG2 to be obtained, thereby completing the traceroute results.

Figure 5:
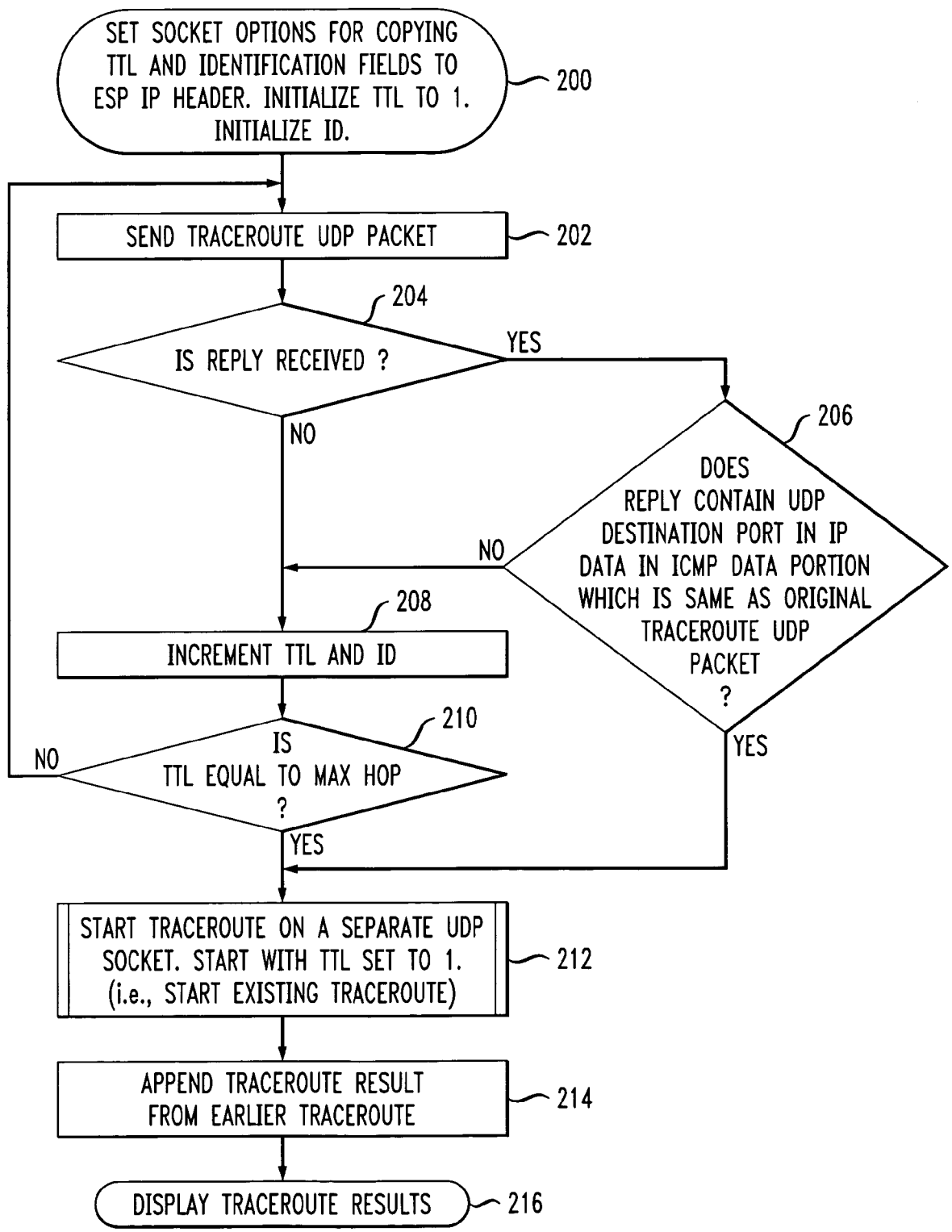
FIG. 5 is a flow diagram of the steps in an exemplary traceroute application in accordance with the present invention.

FIG. 5 is a flow diagram of the traceroute application in the illustrative embodiment. In step 200, the socket options are set for copying the TTL value and the identification field to the ESP IP header. The TTL value is initialized to one, and the identification field is also initialized. In step 202, a traceroute UDP packet is sent.

If a reply is received in step 204, step 206 determines if the reply contains the UDP destination port, in the IP data in the ICMP data portion, which is the same as that of the original traceroute UDP packet. If not, or if no reply is received in step 204, the process proceeds to step 208 to increment the TTL and identification field. If the incremented TTL is less than the maximum hop count in step 210, the process returns to step 202 to send another traceroute UDP packet using the incremented TTL and identification field. If the incremented TTL in step 210 is equal to the maximum hop count, or if the result of the determination in step 206 is affirmative, the process continues with step 212.

In step 212, a traceroute application is started on a separate UDP socket, with TTL initialized to one. As described previously, this is equivalent to starting the "existing" or conventional traceroute application, in order to obtain remaining router hop information. In step 214, the traceroute results from step 212 are appended to those results obtained prior to step 212, and in step 216 the combined results are displayed to a user or otherwise processed so as to provide an indication as to the location of a network connectivity problem.

It is to be appreciated that the particular traceroute application described in conjunction with the diagrams of FIGS. 3, 4 and 5 is presented by way of example, and numerous alternative embodiments of the invention are possible.

The identification field in the illustrative embodiment is used in the validation of ICMP reply packets received responsive to traceroute UDP packets. The identification field in IP as described in RFC 791 serves to identify the IP packet, and is primarily used in conjunction with fragmentation. The identification field in the IP header is not modified by fragmentation logic and all the fragments of a large IP packet each contain the same identification field as the original packet. Fragment reassembly is based upon four fields: Source IP, Destination IP, IP Protocol type, and the identification field.

RFC 791 indicates that the identification field should be chosen by an upper protocol layer that is having IP send the datagram. This implies that two consecutive IP datagrams, one generated by TCP and one generated by UDP, can have the same identification field. While this is acceptable, since it is handled by reassembly, many IP software implementations have the IP layer increment a kernel variable each time an IP datagram is sent, regardless of which layer passed the data to IP to send. This kernel variable is initialized to value based on the time of day when the system is booted up.

It is important when utilizing the invention in such implementations to make sure that the identification field generated by the new traceroute application should not conflict with the system-generated identification for the same protocol type. Otherwise this may cause issues with fragment reassembly logic.

Consider an example such as that shown in FIG. 3 in which the improved traceroute application uses an identification value 2300 for a traceroute packet. This identification value is copied to an encapsulation IP header and SG1 sends the ESP packet with identification value 2300. At the same time SG1 encapsulates other IP traffic and generates the identification values for each encapsulation IP header. As the ESP protocol implementation for generation of identification value is independent from the traceroute application, the ESP protocol implementation may end up generating the same identification value 2300. If this ESP packet gets fragmented, the reassembly device (SG2 in the present example) will get a fragmented packet having identification 2300 along with a traceroute ESP packet also having identification 2300, which will clearly cause problems for the reassembly logic.

This issue can be resolved by reserving a part of the identification value range for the improved traceroute application. In other words, the improved traceroute technique of the illustrative embodiment should be configured to use an identification field from a reserved range within the system. This is done to ensure that the traceroute identifier does not conflict with the system-generated identification field. For an implementation where identification is generated globally for all protocols, this change will typically require reserving the identification value range from the global identification generation logic. For implementations where ESP is doing identification generation independent of other protocols, the range need only be reserved from ESP identification generation logic.

Various methods may be used to dynamically manipulate the firewalls of security gateways such as SG1 and SG2. Generally, firewall rules in the encapsulating device which initiates the traceroute application (e.g., SG1), and in any other device in the network path, should allow passage of the incoming ICMP reply (Time Exceeded and Port Unreachable) packets. Because of security concerns, it is undesirable for SG1 to always allow incoming ICMP packets of any type.

To avoid such security concerns, it is preferable to dynamically update the SG1 firewall to allow ICMP replies only when the traceroute application is running. Also, firewall rules in the decapsulating device (e.g., SG2) should allow passage of the outgoing ICMP reply packets generated by that device. This will allow the traceroute application running on SG1 to display SG2 as a router hop in its results.

In the illustrative embodiment, AH is not applied to the outer IP header. However, since all manipulation in the encapsulating IP header happens before AH or ESP is applied, it does not make a difference if AH is also being used along with ESP.

The improved traceroute application of the illustrative embodiment can also be used with non-VPN network topologies. For example, the improved traceroute application can be run outside of the VPN, in which case the results produced will be identical to those produced using the conventional traceroute application.

Consider an example in which the improved traceroute application is being run on SG1 for a destination in public Internet 102 (outside the VPN). The very first reply of the traceroute packet sent on a special socket (with socket options set to copy the TTL value and identification field) will get the ICMP Time Exceeded reply from R1. The traceroute application will try to determine whether the IP data portion in the ICMP reply packet data portion contains the destination UDP port of the original traceroute packet. This would be true in this case, as the original packet is not encapsulated. The improved traceroute application will discard this reply and will start the conventional traceroute application to complete the traceroute results. This is why the results produced by the improved traceroute application when running outside the VPN will be the same as the results produced by the conventional traceroute application.

The improved traceroute application can be used with a variety of other encapsulation protocols, and the invention is not restricted in this regard. For example, the improved traceroute application will work for any other Layer 3 IP encapsulation protocol and is not limited to only VPN encapsulation protocols. As a more specific example, the improved traceroute technique can be used with the Generic Routing Encapsulation (GRE) protocol.

As indicated above, the improved traceroute application of the illustrative embodiment utilizes non-standard socket options. Implementation of these socket options will be dependent on the encapsulation protocol being used.

It should be noted that, in cases where an intermediate NAT device or firewall drops the ICMP reply (Time Exceeded or Port Unreachable) packet, the improved traceroute application of the illustrative embodiment will typically not be able to produce complete results. This is also a limitation of the existing traceroute application.

The improved traceroute application of the illustrative embodiment should be executed on the same device or other processing element which is also doing the encapsulation of the traceroute packets. In the examples above, the encapsulation devices are SG1 and SG2. The improved traceroute application will typically not produce complete router hop information if being run on a device which is not doing the encapsulation (e.g., PC1 doing traceroute for PC2 in FIG. 1). In such a case the improved traceroute application will produce substantially the same results as the conventional traceroute application.

It is to be appreciated, however, that a given traceroute packet need not be initiated from the encapsulation device. For example, it is possible for an encapsulation device to perform all of the needed header manipulation for a traceroute packet initiated from a private subnet of the encapsulation device. This may be accomplished, again by way of example, by providing the following functionality:

1. Allowing configuration for a maximum TTL (max_host_ttl) value below which traceroute manipulation logic will be applied for packets coming from the private subnet of the encapsulation device. A typical value for max_host_ttl may be 32, although other values can be used.

2. When a first traceroute packet is received from a host behind this encapsulation device, initialize a variable inner_ttl to 1 for this host. This variable will be used to set an inner IP header TTL from this host.

3. During encapsulation, if the TTL received is less than or equal to max_host_ttl, then copy the TTL to the encapsulated outer IP header and set the inner IP header TTL to the inner_ttl value. Record the inner IP header plus eight bytes of data in a data structure along with the host IP.

4. Set the identifier value for an outer IP header as the appropriate value from the reserved range of identifiers. Record this value as well.

5. If an ICMP Time Exceeded reply packet is received for which this encapsulation device applied the manipulation (can be identified using the identifier value in the IP header in the ICMP data portion), send an ICMP Time Exceeded reply packet for the original host by applying proper manipulations using the recorded IP header plus eight bytes of data. That is, the host should get this packet as if a router has directly sent the ICMP Time Exceeded reply packet to it.

6. If during decapsulation any packet has a matching inner identifier with the recorded values, then increment the inner_ttl by 1.

7. Remove all states associated with a host after a designated timeout (may be configurable) or when an ICMP Port Unreachable reply packet is received during decapsulation.

A given implementation may increment inner_ttl in the event that several consecutive responses are not received for UDP packets. This is done to accommodate situations in which a private router immediately behind the encapsulation device cannot send packets to the traceroute initiation host. Also, it is possible to keep the values of the outer IP header TTL as a fixed number once the ICMP reply has been received from the private side of the peer encapsulation device. This may allow the traceroute logic to discover an additional network path to the peer encapsulation device. Numerous other variations in this procedure, and others described herein, can be made as needed to accommodate the particular needs of a given application.

The above-described connectivity problem location application is simply one example of a particular application of the improved traceroute technique described herein. Two other exemplary applications, namely, VPN network path failover and an SG with "keep alive" enabled, will now be described.

VPN network path failover provides the ability for VPN administrators to set up a VPN topology with the following characteristics:

1. Multiple, geographically separate, VPN Tunnel End Points (TEPs) may protect a designated set of network resources. We will refer to this set of network resources as the "central site" or "central-site resources."

2. Failure of any link along the network path between a remote SG (i.e., an SG protecting a network separate from the central site) and designated central-site network resources is automatically detected by the remote VPN unit with the remote VPN unit then automatically switching to an available, alternate network path to re-establish access to the central-site resources.

This allows the VPN administrator to maintain availability of the central-site resources to remote offices and remote users in the event of a failure in one or more network links along one of the network paths into the central site. Note again that the VPN units protecting the central-site resources need not be co-located. This allows for each VPN unit to be deployed such that it is insulated from events that may affect another VPN unit.

Configuring the SG with failover enabled causes the SG to send ICMP connectivity checks to the configured hosts at a configurable interval. It is also possible to configure a criterion which is based on how many consecutive "no responses" for a configured number of hosts will trigger a failover event. During a failover event, the SG tries to connect to an alternate VPN head end to get access to central-site resources.

The traceroute technique can be used in the above-described failover context by, for example, configuring the SG for a traceroute initiation criterion. Such a traceroute initiation criterion may be based on a designated number of consecutive "no responses" for failover ICMP connectivity checks sent to the failover hosts. When the traceroute initiation criterion is met (e.g., the SG missed the configured number of consecutive responses), the SG automatically initiates traceroute to one of the failed failover hosts. The traceroute results may be logged in otherwise conventional Event Log and Simple Network Management Protocol (SNMP) tables. This feature provides useful information regarding the exact point of failure in the VPN network path which caused the failover event. It should be noted that the failover event is held until the traceroute is completed as the failover event changes the VPN network path (the SG starts communicating to an alternate head end).

The second of the two additional examples, SG with "keep alive" enabled, will now be described. An SG with "keep alive" enabled sends ICMP connectivity checks to the configured hosts at a configured interval. This feature also allows configuration for a traceroute initiation criterion. The traceroute initiation criterion may be based on number of consecutive "no responses" for keep alive ICMP connectivity checks sent to keep alive configured hosts. When the traceroute initiation criterion is met (e.g., the SG missed the configured number of consecutive responses), the SG automatically initiates traceroute to one of the failed keep alive hosts. Again, the traceroute results may be logged in Event Log and SNMP tables. This feature provides useful information regarding the exact point of failure in the network path to the desired keep alive hosts.

The information gathered in these and other example applications is intended to be construed as a type of "network-characterizing information" as that term is used herein. Of course, the invention can be implemented to determine such information in numerous other applications, as will be appreciated by those skilled in the art.

A given traceroute application in accordance with the present invention may be implemented, for example, in a network monitoring and analysis system of a communication system, as will now be described with reference to FIGS. 6 and 7.

U.S. patent application Ser. No. 10/643,275, filed Aug. 19, 2003 and entitled "Method and Apparatus for Automatic Determination of Performance Problem Locations in a Network," which is incorporated by reference herein, discloses an improved network monitoring and analysis system which provides information useful for locating the sources of performance problems at a link level, as well as for other purposes. In one aspect of the invention disclosed therein, a network monitoring and analysis system is configured to include a root cause analysis function that permits the automatic determination of performance problem locations in the network.

Figure 6:
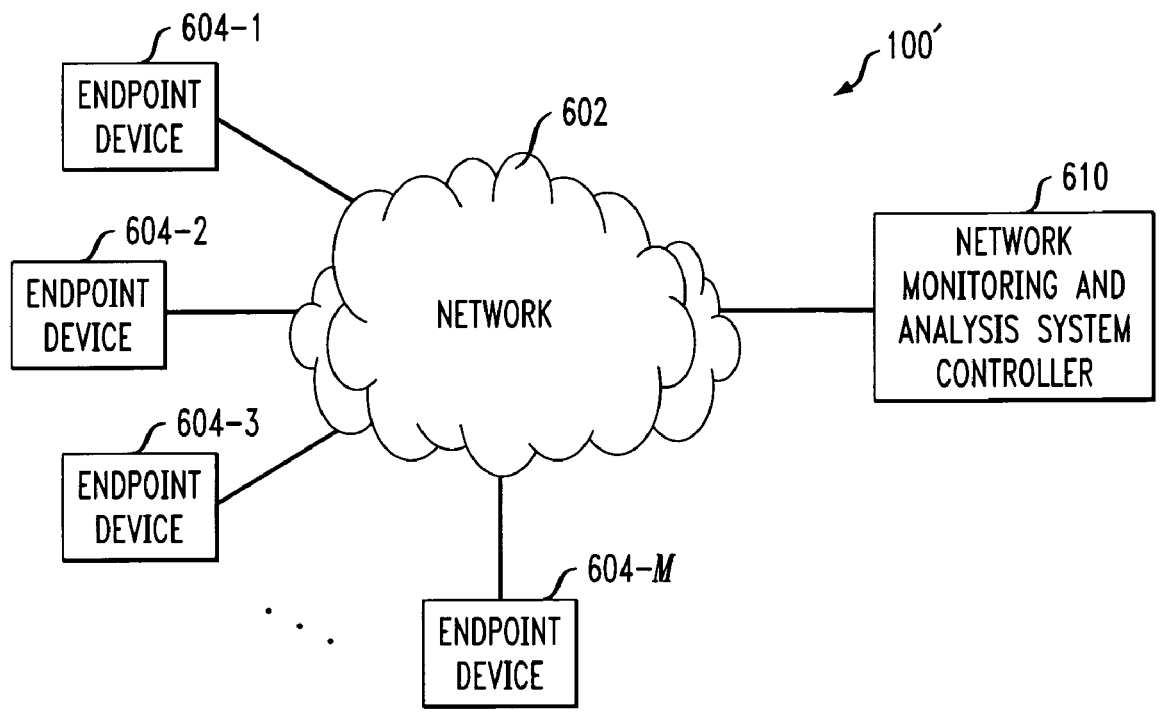
FIG. 6 shows an exemplary communication system in which the invention is implemented.

FIG. 6 shows an example network-based communication system 600 in which the present invention is implemented. The system 600 includes an arbitrary number M of endpoint devices 604-$j$, j=1, 2, . . . M, and a network monitoring and analysis system controller 610. Each of the endpoint devices 604 and the controller 610 is coupled to or otherwise associated with a network 602.

Although shown for simplicity of illustration as terminal endpoint devices in the figure, one or more of the endpoint devices of the system may comprise or be otherwise associated with an internal node of network 602.

An illustrative embodiment of the invention as implemented in the network-based communication system 600 of FIG. 6 advantageously permits automated determination of the particular location(s) associated with one or more connectivity problems or other performance problems in the network 602. The controller 610 may illustratively comprise an otherwise conventional controller of a network monitoring and analysis system, implemented in or otherwise utilized in conjunction with the system 600, suitably modified to include a problem location determination function utilizing the above-described traceroute application.

The term "network monitoring and analysis system" as used herein is intended to include a network monitoring system, a network analysis system, or a system capable of both network monitoring and network analysis.

One example of a network monitoring and analysis system that may be configured to utilize the improved traceroute application of the illustrative embodiment is the ExpertNe™ network readiness assessment tool commercially available from Avaya Inc. of Basking Ridge, N.J., USA. The ExpertNe™ tool may be configured to collect various measurements from a network, including, by way of example, topology information, periodic traffic measurements from network devices via SNMP, and end-to-end performance measurements collected with the use of software agents installed at various endpoint devices or elsewhere in the network. The conventional aspects of this tool and other network monitoring and analysis systems are well known in the art, and therefore will not be further described herein. Such systems may be implemented at least in part in the form of software running on a computer or other processing device associated with the controller 610.

Further aspects of network monitoring and analysis systems that may be utilized in conjunction with the invention are described in the following U.S. patent applications: Ser. No. 10/270,011, entitled "Report Generation and Visualization Systems and Methods and Their Use in Testing Frameworks for Determining Suitability of a Network for Target Applications," Ser. No. 10/270,335, entitled "Network Topology Discovery Systems and Methods and Their Use in Testing Frameworks for Determining Suitability of a Network for Target Applications," and Ser. No. 10/270,122, entitled "Network Traffic Generation and Monitoring Systems and Methods for Their Use in Testing Frameworks for Determining Suitability of a Network for Target Applications," all of which were filed on Oct. 15, 2002, the disclosures of which are incorporated by reference herein.

Additional details regarding possible network monitoring and analysis system features that may be implemented in the system 600 are described in U.S. patent application Ser. No. 10/261,431, filed Sep. 30, 2002 and entitled "Communication System Endpoint Device With Integrated Call Synthesis Capability," U.S. patent application Ser. No. 10/459,948, filed Jun. 12, 2003 and entitled "Distributed Monitoring and Analysis System for Network Traffic," and U.S. patent application Ser. No. 10/460,700, filed Jun. 12, 2003 and entitled "Method and Apparatus for Determination of Network Topology," the disclosures of which are incorporated by reference herein.

Although system 600 is shown as including a centralized controller 610 in FIG. 6, this should not be construed as a requirement of the invention. The invention can alternatively be implemented using a distributed monitoring and analysis system as described in the above-cited U.S. patent application Ser. No. 10/459,948, or using a combination of centralized and distributed techniques. In such embodiments, the functions of the controller 610 may be distributed at least in part across one or more of the endpoint devices, and/or associated distributed test units.

The term "controller" as used herein is therefore intended to include a centralized controller, a distributed controller, or a hybrid controller which is at least partially centralized and at least partially distributed.

The endpoint devices 604 may comprise, for example, otherwise conventional wired or wireless IP telephones (including devices commonly referred to as IP "softphones"), personal digital assistants (PDAs), mobile telephones, personal computers (PCs), or other types of processing devices, suitably configured for interaction with the controller 610 in providing various functions of the network monitoring and analysis system.

It should be noted that the endpoint devices 604 are each typically configured to operate as both receiver and transmitter, as in the case of a bidirectional Voice over IP (VoIP) communication established between a given pair of endpoints.

Conventional aspects of such endpoint devices are well known in the art and therefore not described in further detail herein.

Additional system elements, not shown in FIG. 6, may be coupled between each of the endpoints 604 and the network 602, or otherwise arranged within the system 600, in accordance with conventional practice.

Network 602 may represent, e.g., a global communication network such as the Internet, a wide area network, a metropolitan area network, a local area network, a wireless cellular network, a public switched telephone network (PSTN), or a satellite network, as well as portions or combinations of these or other communication networks. The network 602 may comprise conventional IP routers, gateways, switches or other packet processing elements.

It should be emphasized that the simplified configuration of the system 600 as shown in FIG. 6 is for purposes of illustration only, and should not be construed as limiting the invention to any particular arrangement of elements. For example, the system 600 may include additional devices, as well as other types and arrangements of routing elements, switching elements or other types of processing elements.

Figure 7:
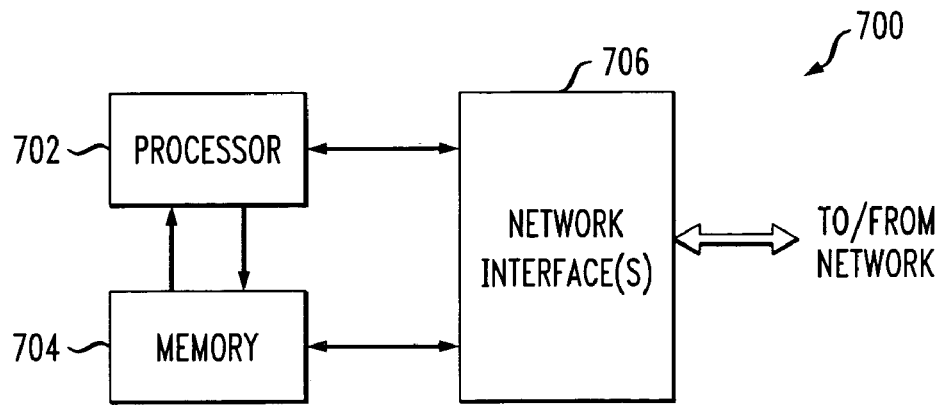
FIG. 7 is a simplified block diagram showing one possible implementation of an endpoint device, controller or other processing element of the FIG. 6 system.

FIG. 7 shows one possible implementation of a given processing element 700 of the FIG. 6 system. The processing element 700 may represent, by way of example, at least a portion of a given one of the endpoint devices 604, at least a portion of the controller 610, or at least a portion of another processing device of the system.

The processing element 700 as shown in the figure includes a processor 702 coupled to a memory 704 and one or more network interfaces 706. The techniques of the present invention may be implemented at least in part in the form of software storable in the memory 704 and executable by the processor 702. The memory 704 may represent random access memory (RAM), read-only memory (ROM), optical or magnetic disk-based storage, or other storage elements, as well as combinations thereof.

Those skilled in the art will recognize that the individual elements of FIG. 7 as shown for illustrative purposes may be combined into or distributed across one or more processing devices, e.g., a microprocessor, an application-specific integrated circuit (ASIC), a computer or other device(s).

The FIG. 7 arrangement is also considerably simplified for purposes of illustration. For example, if viewed as representative of a given one of the security gateways SG1 or SG2 of FIGS. 1 through 4, the processing element 700 may include conventional elements typically associated with such a device, such as a firewall.

The present invention can be used with voice, video, multimedia or any other type of network traffic in a network-based communication system, including VoIP communications.

The terms "endpoint" and "endpoint device" are used interchangeably herein and are intended to include an origination or destination device associated with a given VoIP call or other type of communication in a network-based communication system.

It is to be appreciated that a given endpoint device therefore need not be a terminal device of the system, and may comprise an internal network element such as, for example, a gateway, a router, a switch, or any other type of non-terminal network element. A given pair of endpoint devices in the illustrative embodiment may be viewed generally as comprising the source and destination nodes of a particular communication path. An endpoint device may therefore be a device comprising or otherwise associated with any network node.

A monitoring and analysis system with an improved traceroute application in accordance with the invention can be implemented as part of or in conjunction with an otherwise conventional VoIP analysis tool or other network management system application that is used, for example, to test, diagnose, troubleshoot or design an Internet telephony system or other type of network-based communication system. An example of a network management system application is the VMON® system from Avaya Inc. of Basking Ridge, N.J., USA.

As previously noted, one or more of the monitoring and analysis functions described above in conjunction with the illustrative embodiments of the invention may be implemented in whole or in part in software utilizing processor 702 and memory 704 associated with a controller or an endpoint device. Other suitable arrangements of hardware, firmware or software may be used to implement the techniques of the invention.

It should again be emphasized that the above-described arrangements are illustrative only. For example, alternative embodiments may utilize different processing element hardware, firmware or software configurations, different network topologies, and different communication protocols than those of the illustrative embodiments. These and numerous other alternative embodiments within the scope of the following claims will be apparent to those skilled in the art.

What is claimed is:

1. A method for determining information characterizing a network comprising a plurality of processing elements including at least one processing element associated with performance of a packet encapsulation operation of an encapsulation protocol, the method comprising the steps of:

performing the packet encapsulation operation on a test packet to generate an encapsulated packet, the test packet having a header comprising a time to live value and an identifier, wherein in conjunction with performance of the packet encapsulation operation the time to live value and the identifier of the test packet are copied from the header of the test packet to a header of the encapsulated packet;

transmitting the encapsulated packet;

determining if a reply packet is received responsive to transmission of the encapsulated packet; and processing the received reply packet, if any, to obtain the information characterizing the network.

2. The method of claim 1 wherein the information characterizing the network comprises information identifying a problem location in the network.

3. The method of claim 1 wherein the information characterizing the network comprises network performance information.

4. The method of claim 1 wherein the information characterizing the network comprises information characterizing a path of a VPN operating in tunnel mode between security gateways of the network.

5. The method of claim 1 wherein the test packet comprises a traceroute UDP packet.

6. The method of claim 1 wherein the packet encapsulation operation comprises a packet encapsulation operation in accordance with the ESP protocol.

7. The method of claim 1 wherein the identifier comprises at least a portion of an identification field of the test packet.

8. The method of claim 1 wherein the performing, transmitting, determining and processing steps are repeated, for subsequent test packets with increasing time to live values, until an amount of router hop information sufficient to determine a problem location is obtained.

9. The method of claim 1 wherein one of first and second security gateways associated with a VPN of the network comprises the processing element associated with performance of the packet encapsulation operation of the encapsulation protocol.

10. The method of claim 1 wherein the time to live value and the identifier are copied from an IP header of a traceroute packet to an IP header of an ESP packet in conjunction with performance of the encapsulation process.

11. A method for determining information characterizing a network comprising a plurality of processing elements including at least one processing element associated with performance of a packet encapsulation operation of an encapsulation protocol, the method comprising the steps of:

performing the packet encapsulation operation on a test packet to generate an encapsulated packet, the test packet having a time to live value and an identifier, wherein in conjunction with performance of the packet encapsulation operation the time to live value and the identifier of the test packet are copied to a header of the encapsulated packet;

transmitting the encapsulated packet;

determining if a reply packet is received responsive to transmission of the encapsulated packet; and processing the received reply packet, if any, to obtain the information characterizing the network;

wherein the copying of the time to live value and the identifier is facilitated by setting corresponding socket options on a UDP socket used to send a traceroute packet comprising the test packet.

12. The method of claim 1 wherein the step of determining if a reply packet has been received responsive to transmission of the encapsulated packet further comprises validating the reply packet by determining if information associated with the test packet is present in a data portion of the reply packet.

13. The method of claim 12 wherein the information associated with the test packet comprises the identifier.

14. The method of claim 12 wherein the information associated with the test packet comprises a destination port of the test packet.

15. The method of claim 1 wherein the reply packet comprises one of an ICMP Time Exceeded reply packet and an ICMP Port Unreachable reply packet.

16. A method for determining information characterizing a network comprising a plurality of processing elements including at least one processing element associated with performance of a packet encapsulation operation of an encapsulation protocol, the method comprising the steps of:

performing the packet encapsulation operation on a test packet to generate an encapsulated packet, the test packet having a time to live value and an identifier, wherein in conjunction with performance of the packet encapsulation operation the time to live value and the identifier of the test packet are copied to a header of the encapsulated packet;

transmitting the encapsulated packet;

determining if a reply packet is received responsive to transmission of the encapsulated packet; and processing the received reply packet, if any, to obtain the information characterizing the network;

wherein if the reply packet is determined to contain in a data portion thereof information identifying a destination port of the test packet, or a maximum time to live value has been reached without receipt of a reply packet containing in a data portion thereof information identifying a destination port of the test packet, a traceroute application that does not involve copying of the time to live value and the identifier is initiated.

17. The method of claim 16 wherein the traceroute application that does not involve copying of the time to live value and the identifier is initiated using a different socket than that used for one or more previous test packets, and a time to live value of one.

18. A method for determining information characterizing a network comprising a plurality of processing elements including at least one processing element associated with performance of a packet encapsulation operation of an encapsulation protocol, the method comprising the steps of:

performing the packet encapsulation operation on a test packet to generate an encapsulated packet, the test packet having a time to live value and an identifier, wherein in conjunction with performance of the packet encapsulation operation the time to live value and the identifier of the test packet are copied to a header of the encapsulated packet;

transmitting the encapsulated packet;

determining if a reply packet is received responsive to transmission of the encapsulated packet; and processing the received reply packet, if any, to obtain the information characterizing the network;

wherein router hop information obtained from one or more iterations of the performing, transmitting, determining and processing steps is combined with additional router hop information obtained by applying said steps using one or more additional test packets but without copying of the time to live value and identifier in conjunction with performance of the packet encapsulation operation.

19. The method of claim 1 wherein the identifier of the test packet is selected from a range of identification values reserved for such test packets in order to prevent conflict with an identification field of non-test packets in the network.

20. The method of claim 1 wherein the test packet originates from a processing element of the network other than a processing element which performs the packet encapsulation operation.

21. The method of claim 1 wherein the performing, transmitting, determining and processing steps are implemented at least in part in software stored in a memory of the processing element and executed by a processor of the processing element.

22. An apparatus for use in determining information characterizing a network comprising a plurality of processing elements including at least one processing element associated with performance of a packet encapsulation operation of an encapsulation protocol, the apparatus comprising:

a processing element comprising a processor coupled to a memory;

the processing element being operative:

(i) to perform the packet encapsulation operation on a test packet to generate an encapsulated packet, the test packet having a header comprising a time to live value and an identifier, wherein in conjunction with performance of the packet encapsulation operation the time to live value and the identifier of the test packet are copied from the header of the test packet to a header of the encapsulated packet;

(ii) to transmit the encapsulated packet;

(iii) to determine if a reply packet is received responsive to transmission of the encapsulated packet; and (iv) to process the received reply packet, if any, to obtain the information characterizing the network.

23. The apparatus of claim 22 wherein the processing element performs operations (i) through (iv) responsive to one or more commands from a controller of a network monitoring and analysis system.

24. The apparatus of claim 22 wherein the processing element is further operative to identify a path of a VPN operating in tunnel mode between security gateways of the network, and to determine network performance information associated with that path.

25. The apparatus of claim 22 wherein the processing element is further operative to determine routing changes associated with a path of a VPN operating in tunnel mode between security gateways of the network.

26. A processor-readable storage medium containing executable software code for use in determining information characterizing a network, the network comprising a plurality of processing elements including at least one processing element associated with performance of a packet encapsulation operation of an encapsulation protocol, wherein the software code when executed implements the steps of:

performing the packet encapsulation operation on a test packet to generate an encapsulated packet, the test packet having a header comprising a time to live value and an identifier, wherein in conjunction with performance of the packet encapsulation operation the time to live value and the identifier of the test packet are copied from the header of the test packet to a header of the encapsulated packet;

transmitting the encapsulated packet;

determining if a reply packet is received responsive to transmission of the encapsulated packet; and processing the received reply packet, if any, to obtain the information characterizing the network.

\* \* \* \* \*

UNITED STATES PATENT AND TRADEMARK OFFICE
CERTIFICATE OF CORRECTION

PATENT NO. : 7,583,667 B2 Page 1 of 1
APPLICATION NO. : 11/014546
DATED : September 1, 2009
INVENTOR(S) : Adhikari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1293 days.

Signed and Sealed this

Fourteenth Day of September, 2010

David J. Kappos
*Director of the United States Patent and Trademark Office*